United States Patent

Marczinke et al.

Patent Number: 5,461,119
Date of Patent: Oct. 24, 1995

[54] OLEFIN POLYMERS PARTIALLY CROSSLINKED WITH BISMALEIMIDO COMPOUNDS

[75] Inventors: Bernd L. Marczinke; Harald Schwager, both of Speyer; Juergen Kerth, Carlsberg, all of Germany

[73] Assignee: BASF Aktiengesellschaft, Ludwigshafen, Germany

[21] Appl. No.: 342,027

[22] Filed: Nov. 16, 1994

Related U.S. Application Data

[63] Continuation of Ser. No. 72,051, Jun. 7, 1993, abandoned.

[30] Foreign Application Priority Data

Jun. 17, 1992 [DE] Germany ............ 42 19 861.5

[51] Int. Cl.[6] ............... C08F 8/30; C08F 8/32
[52] U.S. Cl. .............. 525/375; 525/73; 525/382; 525/383
[58] Field of Search .................. 525/375, 382, 525/73

[56] References Cited

U.S. PATENT DOCUMENTS 5,143,953  9/1992  Pourahmady ............... 524/104

FOREIGN PATENT DOCUMENTS 2269128  11/1990  Japan.

OTHER PUBLICATIONS

Chow et al., Gummi, Ashest, Kunstet, 31, (1978).
Tawney et al., J. Appl. Polymer Sci. vol. 8 pp. 2231–2298 (1961).
Miller et al., J. Polym. Sci. 58 (1962) 737.
Japanese Preliminary Published Application 269 128/90.

*Primary Examiner*—Fred Zitomer
*Attorney, Agent, or Firm*—Keil & Weinkauf

[57] ABSTRACT

Partially crosslinked olefin polymers are obtainable by reacting a) an ethylene polymer having a density of from 0.90 to 0.98 g/cm$^3$ or b) a polymer of from 25 to 95% by weight of a propylene homopolymer and from 5 to 75% by weight of a propylene copolymer with polymerized $C_2$–$C_{10}$-alk-1-enes, the comonomer content being from 1 to 45% by weight, based on the total polymer, in the absence of free radical initiators, with from 0.001 to 5% by weight, based on the olefin polymer, of a bismaleimido compound of the general formula (I)

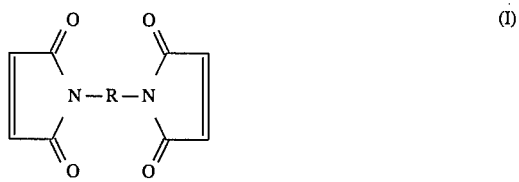

where R is $C_1$–$C_{20}$-alkyl which may be interrupted by one or more oxygen atoms, or is $C_5$–$C_7$-cycloalkyl or $C_6$–$C_{15}$-aryl, each of which in turn may be substituted by one or more $C_1$–$C_{10}$-alkyl and/or $C_1$–$C_6$-alkoxy and/or $C_1$–$C_4$-dialkylamino groups, or is a radical of the following formula (II)

$$R^1-Z-R^2 \qquad (II)$$

where $R^1$ and $R^2$ independently of one another are each $C_1$–$C_{10}$-alkyl, $C_5$–$C_7$-cycloalkyl or $C_6$–$C_{10}$-aryl, each of which in turn may be substituted by one or more $C_1$–$C_{10}$-alkyl and/or $C_1$–$C_6$-alkoxy and/or $C_1$–$C_4$-dialkylamino groups, and Z is $C_1$–$C_{10}$-alkyl, $C_1$–$C_4$-dialkylamino, oxygen or sulfonyl.

6 Claims, No Drawings

OLEFIN POLYMERS PARTIALLY CROSSLINKED WITH BISMALEIMIDO COMPOUNDS

This application is a continuation of application Ser. No. 08/072,051, filed on Jun. 7, 1993, now abandoned.

The present invention relates to partially crosslinked olefin polymers which are obtainable by reacting a) an ethylene poller having a density of from 0.90 to 0.98 g/cm$^3$ or b) a single polymer, comprising
propylene homopolymer, and
random propylene copolymer containing, propylene and $C_2$–$C_{10}$-alk-1-ene comonomers, said propylene homopolymer being present in said polymer b) in an amount of from 25 to 95% by weight of polymer b), said propylene copolymer being present in said polymer b) in an amount of from 5 to 75% by weight of polymer b), and each of said comonomers being present in said polymer b) in an amount of from 1 to 45% by weight of polymer b), in the absence of free radical initiators, with from 0,001 to 5% by weight, based on the olefin polymer, of a bismaleimido compound of the formula (I)

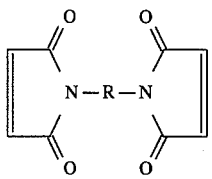

where R is $C_1$–$C_{20}$-alkyl which may be interrupted by one or more oxygen atoms, or is $C_5$–$C_7$-cycloalkyl or $C_6$–$C_{15}$-aryl, each of which in turn may be substituted by one or more $C_1$–$C_{10}$-alkyl and/or $C_1$–$C_6$-alkoxy and/or $C_1$–$C_{10}$-dialkylamino groups, or is a radical of the following formula (II)

where $R^1$ and $R^2$ independently of one another are each $C_1$–$C_{10}$-alkyl, $C_5$–$C_7$-cycloalkyl or $C_6$–$C_{10}$-aryl, each of which in turn may be substituted by one or more $C_1$–$C_6$-alkyl and/or $C_1$–$C_6$-alkoxy and/or $C_1$–$C_4$-dialkylamino groups, and Z is $C_1$–$C_{10}$-alkyl, $C_1$–$C_4$-dialkylamino, oxygen or sulfonyl.

The present invention furthermore relates to a process for the preparation of these partially cross-linked olefin polymers and to films and moldings of these olefin polymers.

It is known that rubbers based on ethylene and propylene can be crosslinked by means of bismaleimido compounds, provided that free radical initiators (cf. for example Y. W. Chow, G. T. Knight: Gummi, Asbest, Kunstst. 31 (1978), 716 et seq.; P. O. Towney et al.: J. Appl. Polym. Sci. 8 (1964), 2281 et seq.) are present or high-energy radiation (cf. S. M. Miller et al.: J. Pollan. Sci. 58 (1962), 737) initiates the reaction. For example, the use of peroxides leads to a decrease in the molecular weight which causes a substantial deterioration in the mechanical properties of the product.

It is also known that propylene copolymers can be grafted with maleic acid derivatives and the grafted compounds then reacted with polyfunctional amines (German Laid-Open Application DOS 4,022,570). The products thus obtainable have either acidic or basic properties, which is undesirable for some industrial applications.

Furthermore, Japanese Preliminary Published Application 269 128/90 describes processes for the thermoforming of polypropylene films, in which polymers of propylene, with or without minor amounts of ethylene, are reacted with an inorganic filler, a lubricant and a bismaleimide. The inorganic fillers used are in particular talc or silica. The lubricants employed include higher fatty acids, alcohols or esters. The materials used are fed together into an extruder without the polymers of propylene having been reacted beforehand with the bismaleimide. The films obtained can be readily molded but have unsatisfactory mechanical strength.

It is an object of the present invention to remedy the disadvantages described and to provide olefin polymers having improved performance characteristics.

We have found that this object is achieved by the olefin polymers defined at the outset and partially crosslinked with bismaleimido compounds in the absence of free radical initiators.

According to the invention, the olefin polymers used are ethylene polymers a) or polymer b) consisting of propylene homopolymers and propylene copolymers.

Polyethylenes having a density of from 0.90 to 0.98, in particular from 0.91 to 0.97, g/cm$^3$ are used as ethylene polymers a). These are predominantly ethylene homopolymers. However, copolymers of ethylene with up to 10% by weight of polymerized $C_3$–$C_8$-alk-1-enes, for example propylene, but-1-ene, pent-1-ene and hex-1-ene, may also be used. The melt flow index of these ethylene polymers a) is preferably from 0.1 to 100, in particular from 1 to 50, g/cm$^3$ at 190° C. and under a weight of 2.16 kg (determined according to DIN 53,735). The melt flow index corresponds to an amount of polymer which is forced, in the course of 10 minutes at 190° C. and under a weight of 2.16 kg, out of the test apparatus standardized according to DIN 53,735.

Such polyethylenes are usually prepared by low pressure polymerization using metal-containing catalysts, for example with the aid of titanium- and aluminum-containing Ziegler catalyts, or by means of Phillips catalysts based on chromium-containing compounds. The polymerization reaction can be carried out in the gas phase, in solution or in suspension, using the reactors conventionally employed in industry. In the preparation of the novel polymer blend, the polyethylene may be used both as grit and as granules.

In this case, polymers b) are understood as meaning polymers which consist of from 25 to 95% by weight of a propylene homopolymer and from 5 to 75% by weight of a random propylene copolymer with polymerized $C_2$–C10-alk-1-enes, eg. ethylene, but-1-ene, pent-1-ene, hex-1-ene, hept-1-ene or oct-1-ene. Preferably used $C_2$–$C_{10}$-alk-1-enes are ethylene and but-1-ene. Particularly suitable polymers b) are those which contain from 10 to 60% by weight of a random propylene copolymer with polymerized $C_2$–$C_{10}$-alk-1-enes, in addition to from 40 to 90% by weight of propylene homopolymer. The comonomer content in the polymer b) is from 1 to 45, preferably from 1 to 40, % by weight, based on the total polymer.

These polymers b) are prepared by polymerization with the aid of Ziegler-Natta catalysts which consist essentially of a titanium-containing solid component, which advantageously contains a finely divided carrier and an electron donor compound, and a cocatalyst. The cocatalysts used are aluminum compounds and advantageously further electron donor compounds. The polymerization can be carried out both in the gas phase and in solution or suspension.

Suitable titanium-containing solid components are in general halides or alcoholates of trivalent or tetravalent titanium, preferably titanium chlorides, in particular titanium tetrachloride. Silicas or aluminas as well as aluminum silicates of the empirical formula $SiO_2 \cdot aAl_2O_3$, where a is from 0.001 to 2, in particular from 0.01 to 0.5, have proven useful as finely divided carriers.

The preferably used carriers have a particle diameter (longest dimension) of from 0.1 to 1,000 µm, in particular from 10 to 300 µm, a pore volume of from 0.1 to 10, in particular from 1.0 to 5.0, cm$^3$/g and a specific surface area of from 10 to 1,000, in particular from 100 to 500, m$^2$/g.

In the preparation of the titanium-containing solid component, compounds of magnesium, in particular magnesium halides, magnesium alkyls and magnesium aryls as well as alkoxymagnesium and aryloxymagnesium compounds, may be used, magnesium chloride, magnesium bromide and di-$C_1$–$C_{10}$-alkylmagnesium compounds being preferably used. In addition, the titanium-containing solid component may contain halogen, preferably chlorine or bromine.

Electron donor compounds, for example mono- or polyfunctional carboxylic acids, carboxylic anhydrides and carboxylates, as well as ketones, ethers, alcohols, lactones and organophosphorus and organosilicon compounds, are also usually present in the titanium-containing solid component. Phthalic acid derivatives of the formula (III)

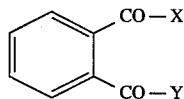 (III)

where X and Y are each chlorine or $C_1$–$C_{10}$-alkoxy or together are oxygen, are preferably used as electron donor compounds in the titanium-containing solid component. Particularly preferred phthalic esters are those in which X and Y are each $C_1$–$C_8$-alkoxy, for example methoxy, ethoxy, propoxy or butoxy.

Further preferred electron donor compounds within the titanium-containing solid component are diesters of 3-membered or 4-membered, unsubstituted or substituted cycloalkane-1,2-dicarboxylic acids, and monoesters of unsubstituted or substituted benzophenone-2-carboxylic acids. The alcohols conventionally employed in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols are used as hydroxy compounds in these esters.

The titanium-containing solid component can, as a rule, be prepared by the methods conventionally employed in industry. A three-stage process in which a solution of the magnesium-containing compound in a liquid alkane is first added to a finely divided carrier having a water content of from 0.5 to 5.0% by weight is preferably used. A halogen or hydrogen halide is then added, and the solid is separated off from the liquid phase. Said solid is introduced into a liquid alkane and the titanium compound and electron donor compound are added, stirring is carried out and the resulting solid substance is filtered off. It is then washed with a liquid alkane, preferably hexane or heptane. In the third stage, extraction is effected with excess titanium tetrachloride or with a solution, present in excess, of titanium tetrachloride in an inert solvent, preferably an alkyl-benzene. The product is then washed in liquid alkane.

The titanium-containing solid component obtainable in this manner is used with cocatalysts as a Ziegler-Natta catalyst system. Suitable cocatalysts are aluminum compounds and further electron donor compounds.

Aluminum compounds which are suitable as a cocatalyst are trialkylaluminums as well as compounds in which an alkyl group has been replaced with an alkoxy group or with a halogen atom, for example chlorine or bromine. Preferably used trialkylaluminumcompounds are those whose alkyl groups are each of 1 to 8 carbon atoms, for example trimethyl-, triethyl- or methyldiethyl-aluminum.

In addition to the aluminum compound, electron donor compounds, for example mono- or polyfunctional carboxylic acids, carboxylic anhydrides and carboxylates, as well as ketones, ethers, alcohols, lactones and organophosphorus and organosilicon compounds, are also preferably used as a further cocatalyst. Preferred electron donor compounds are organosilicon compounds of the general formula (IV)

$$R^3{}_n Si(OR^4)_{4-n} \qquad (IV)$$

where the radicals $R^3$ are identical or different and are each $C_1$–$C_{20}$-alkyl, or a 5-membered to 7-membered cycloalkyl group which in turn may carry a $C_1$–$C_{10}$-alkyl group, or are each $C_6$–$C_{20}$-aryl, or arylalkyl, the radicals $R^4$ are identical or different and are each $C_1$–$C_{20}$-alkyl and n is 1, 2 or 3. Particularly preferred compounds of this type are those in which $R^3$ is $C_1$–$C_8$-alkyl or a 5-membered to 7-membered cycloalkyl group, $R^4$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are particularly noteworthy.

Preferably used catalyst systems are those in which the atomic ratio of aluminum from the aluminum compound to titanium from the titanium-containing solid component is from 10 : 1 to 800 : 1, in particular from 20 : 1 to 200 : 1, and the molar ratio of aluminum compound to electron donor compound used as the cocatalyst is from 1 : 1 to 100 : 1, in particular from 2 : 1 to 80 : 1. The individual catalyst components may be introduced into the polymerization system individually in any order or as a mixture of two components.

The polymers b) required for the preparation of the novel partially crosslinked olefin polymers can be prepared by a two-stage process, propylene being polymerized in a first polymerization stage and a mixture of propylene and one or more $C_2$–$C_{10}$-alk-1-enes then being polymerized with this polymer in a second polymerization stage.

The polymerization of the propylene in the first polymerization stage is carried out at from 20 to 40, preferably from 20 to 35, bar and from 60° to 90° C., preferably from 65° to 85° C., and in an average residence time of the reaction mixture of from 1 to 5, preferably from 1.5 to 4, hours. The reaction conditions are usually chosen so that from 0.05 to 2, preferably from 0.1 to 1.5, kg of polypropylene are formed per mmol of aluminum component in the first polymerization stage.

This polypropylene is discharged with the catalyst from the first polymerization stage after the end of the reaction and is introduced into the second polymerization stage, where a mixture of propylene and one or more $C_2$–$C_{10}$-alk-1-enes, in particular ethylene or but-1-ene, is polymerized with it. The pressure in the second polymerization stage is 7, preferably 10, bar below that of the first polymerization stage and is from 5 to 30, preferably from 10 to 25, bar. The temperature is from 30° to 100° C., preferably from 35° to 80° C., and the average residence time of the reaction mixture is from 1 to 5, preferably from 1.5 to 4, hours.

In the second polymerization stage, the ratio of the partial pressure of propylene to that of the $C_2$–$C_{10}$-alk-1-ene or $C_2$–$C_{10}$-alk-1-enes is usually from 0.5 : 1 to 5 : 1, in particular from 1 : 1 to 4 : 1. The weight ratio of the monomers reacted in the first polymerization stage to the monomers reacted in the second polymerization stage is preferably from 1 : 1 to 20 : 1, in particular from 2 : 1 to 15 : 1.

It is also possible to add a $C_1$–$C_8$-alkanol, in particular a $C_1$–$C_4$-alkanol, to the reaction mixture in the second polymerization stage, said alkanol influencing the activity of the Ziegler-Natta catalyst. Alcohols which are suitable for this purpose are methanol, ethanol, n-propanol, n-butanol and very particularly isopropanol. The amount of the added $C_1$–$C_8$-alkanol is advantageously such that the molar ratio of the aluminum compound to the $C_1$–$C_8$-alkanol is from 0.1 : 1 to 10 : 1, in particular from 0.2 : 1 to 5 : 1. By a suitable choice of the reaction parameters, it should also be ensured that the weight ratio of the monomers reacted in the first polymerization stage to those reacted in the second polymerization stage is from 1 : 1 to 20 : 1, in particular from 1.5 : 1 to 15 : 1.

According to the invention, the partially crosslinked olefin-polymers are obtainable by reacting the olefin polymers with from 0.001 to 5, preferably from 0.01 to 3, % by weight, based on the total weight of the olefin polymers, of bismaleimido compounds of the general formula (I).

Suitable bismaleimido compounds are those of the formula I

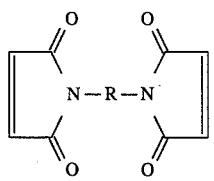

where R is $C_1$–$C_{20}$-alkyl which may be interrupted by one or more oxygen atoms, or is $C_5$–$C_7$-cycloalkyl or $C_6$–$C_{15}$-aryl, each of which in turn may be substituted by one or more $C_1$–$C_{10}$-alkyl and/or $C_1$–$C_6$-alkoxy and/or $C_1$–$C_4$-dialkylamino groups, or is a radical of the following formula (II)

where $R^1$ and $R^2$ independently of one another are each $C_1$–$C_{10}$-alkyl, $C_5$–$C_7$-cycloalkyl or $C_6$–$C_{10}$-aryl, each of which in turn may be substituted by one or more $C_1$–$C_{10}$-alkyl and/or $C_1$–$C_6$-alkoxy and/or $C_1$–$C_4$-dialkylamino groups, and Z is $C_1$–$C_{10}$-alkyl, $C_1$–$C_4$-dialkylamino, oxygen or sulfonyl.

Preferred bismaleimido compounds of the general formula (I) are those in which R is $C_2$–$C_{10}$-alkyl which may be interrupted by one or more oxygen atoms, or is $C_5$–$C_7$-cycloalkyl or $C_6$–$C_{15}$-aryl, each of which in turn may be substituted by one or more $C_1$–$C_4$-alkyl groups, or is a radical of the formula (II) $R^1$-Z-$R^2$, where $R^1$ and $R^2$ independently of one another are each $C_1$–$C_6$-alkyl, $C_5$–$C_7$-cycloalkyl or $C_6$–$C_{10}$-aryl, and Z is oxygen or sulfonyl.

Particularly preferably used bismaleimido compounds are in particular 1,6-bismaleimidohexane, 1,3-bismaleimidobenzene, 1,3-bismaleimido-4-methylbenzene, 4,4'-bismaleimidodiphenylmethane, 4,4'-bismaleimido-3,5,3',5'-tetramethyldiphenylmethane and 3,3'-bismaleimidodiphenyl sulfone.

The bismaleimido compounds can be prepared, for example, by reacting maleic anhydride with the corresponding diamines and then with acetic acid and sodium acetate. Such preparation processes are known to the skilled worker.

One bismaleimido compound is preferably used in the partially crosslinked olefin polymers. However, it is also possible to use a mixture of two or more different bismaleimido compounds.

The novel partially crosslinked olefin polymers are usually prepared by a process in which, in the absence of a free radical initiator, from 0.001 to 5% by weight, based on the olefin polymer, of bismaleimido compounds of the formula (I) are mixed with the molten olefin polymer and the reaction is carried out at from 180° to 280° C. and from 1 to 100 bar and in an average residence time of the reaction mixture of from 0.2 to 10 minutes. The bismaleimido compounds are preferably used in concentrations of from 0.01 to 3, in particular from 0.01 to 1, % by weight, based on the olefin polymer. The reaction can advantageously be carried out at from 190° to 270° C., in particular from 200° to 260° C., and from 1 to 50 bar and in a residence time of from 0.2 to 5, in particular from 0.5 to 5, minutes.

As a rule, this reaction can be carried out in the mixing apparatuses conventionally used in plastics technology, for example an extruder or a Brabender mixer. Twin-screw extruders are particularly suitable. In a preferred embodiment, the olefin polymer is metered, together with the bismaleimido compound and in the absence of a free radical initiator, into the feed of a twin-screw extruder, where the mixture is first melted and then reacted at from 180° to 280° C. for from 0.2 to 10 minutes. The bismaleimido compound may also be added to the extruder after the olefin polymer has been melted. In a preparation process which is likewise preferred, the bismaleimido compounds are added to the olefin polymers immediately after their preparation in a mixing apparatus connected to the preparation reactor.

The partially crosslinked olefin polymers obtainable in this manner usually contain from 0.001 to 5% by weight of bismaleimido compounds. They are colorless and odorless. Their melt flow indices and the xylene-soluble fractions are substantially lower than those of the unmodified olefin polymers. The melt flow indices are from 0.1 to 100, preferably from 0.1 to 50, g/10 min, measured according to DIN 53,735 at 230° C. and 2.16 kg. The melt flow index corresponds to the amount of polymer which is forced, in the course of 10 minutes at 230° C. and under a weight of 2.16 kg, out of the test apparatus standardized according to DIN 53,735. Partially crosslinked olefin polymers are thermoplastic and can therefore be readily processed. They have high mechanical stability and are suitable, for example, for the production of moldings and films.

EXAMPLES

The Examples and the Comparative Examples were carried out in a twin-screw extruder from Werner & Pfleiderer (ZSK 40). The polymer throughput in the extruder was 20 kg/h at 150 revolutions per minute. The reaction was carried out at about 30 bar.

EXAMPLES A1 AND A2

100 parts by weight of a polymer b) (A) containing 80.1% by weight of propylene homopolymer and 19.9% by weight of a propylene/ethylene copolymer [determined by extraction fractionation according to W. Holtrup, Makromol. Chem. 178 (1977), 2335], having a total ethylene content of 11.9% by weight [determined by Fourier transform infrared spectroscopy] and a melt flow index of 13.2 g/10 min [at 230° C. and 2.16 kg, according to DIN 53,735] were mixed with 0.1 or 0.2 part by weight of 1,3-bismaleimidobenzene and reacted at 240° C. in the reaction zone of the ZSK 40 twin-screw extruder. The average residence time of the components was 2 minutes. After the end of the reaction, the product was cooled in a water bath, then granulated and dried.

EXAMPLES B1 AND B2

100 parts by weight of the polymer b) (B) containing 62.5% by weight of propylene homopolymer and 37.5% by weight of a propylene/ethylene copolymer [determined by extraction fractionation according to W. Holtrup, Makromol. Chem. 178 (1977), 2335], having a total ethylene content of 24.9% by weight and a melt flow index of 17.3 g/10 min, were reacted with 0.1 or 0.2 part by weight of 4,4'-bismaleimido-3,5,3',5'-tetramethyldiphenylmethane under the conditions of Examples A1 and A2.

The results of the tests for the performance characteristics are shown in Table 1.

TABLE 1

|  | Examples | | | | | |
| --- | --- | --- | --- | --- | --- | --- |
|  | A | A1 | A2 | B | B1 | B2 |
| Total of bis-maleimido compound [parts by weight per 100 parts by weight of polymer b)] | 0 | 0.1 | 0.2 | 0 | 0.1 | 0.2 |
| Melt flow index* [g/10 min] | 13.2 | 11.3 | 10.6 | 17.3 | 9.3 | 9.1 |
| G modulus** [N/mm2] | 530 | 480 | 470 | 330 | 280 | 275 |
| Notched impact strength*** [kJ/m2] |  |  |  |  |  |  |
| at −20° C. | 2.8 | 4.5 | 4.9 | 6.9[a] | 8.1[c] | 7.4[c] |
| at −40° C. | 2.1 | 3.1 | 3.4 | 16.3[b] | >38.3 | >37.3 |
| Xylene-soluble fractions [%] | 20.8 | 15.1 | 13.9 | 34.8 | 24.1 | 21.1 |

*According to DIN 53,735, at 230° C. and 2.16 kg
**According to DIN 53,453
***According to DIN 53,453
[a] 40% fracture
[b] 60% fracture
[c] 100% fracture

EXAMPLE C 100 parts by weight of a polymer b) containing 79.7% by weight of propylene homopolymer and 20.3% by weight of a propylene/ethylene copolymer having a total ethylene content of 12.8% by weight and a melt flow index of 12.0 g/10 min [at 230° C. and 2.16 kg, according to DIN 53,735] were reacted with 0.2 part by weight of 1,3-bismaleimidobenzene at 240° C. in a ZSK 40 twin-screw extruder. The average residence time was 2 minutes. After the end of the reaction, the product was cooled in a water bath, then granulated and dried.

COMPARATIVE EXAMPLE C'

The polymer b) used in Example C was reacted with 0.2 part by weight of 1,3-bismaleimidobenzene under the same conditions as in Example C. In contrast to Example C, the reaction was carried out here in the presence of 0.05 part by weight, based on the olefin polymer, of 2,5-dimethyl- 2,5-di-(tert-butylperoxy)-hexane.

In Table 2 below, the values for the melt flow index, the G modulus and the notched impact strength are shown for the polymers obtained.

TABLE 2

|  | Example C | Comparative Example C' |
| --- | --- | --- |
| Melt flow index* [g/10 min] | 9.0 | 16.1 |
| G modulus** [N/mm²] | 500 | 520 |
| Notched impact strength [kJ/m²] |  |  |
| at −20° C. | 4.9 | 3.0 |
| at −40° C. | 3.3 | 2.3 |

*According to DIN 53,735, at 230° C. and 2.16 kg
**According to DIN 53,453
***According to DIN 53,453

The results of Table 2 show that the reaction of the olefin polymers with bismaleimide in the presence of peroxides leads to polymers having a lower notched impact strength. Moreover, the increased melt flow index indicates a decrease in the molecular weight.

EXAMPLES D1 AND D2

100 parts by weight of a polyethylene (D) having a density of 0.96 g/cm³ and a melt flow index of 8.3 g/10 min [at 190° C. and 2.16 kg, according to DIN 53,735] were mixed with 0.1 or 0.2 part by weight of 1,3-bismaleimidobenzene and reacted in the reaction zone of the ZSK 40 twin-screw extruder at 220° C. The average residence time was 1 minute. The melt was then extruded into a water bath, granulated and dried.

The results of the tests for the performance characteristics are shown in Table 3.

TABLE 3

|  | Examples | | |
| --- | --- | --- | --- |
|  | D | D1 | D2 |
| Content of bismaleimido compound [parts by weight per 100 parts by weight of polymer b)] | 0 | 0.1 | 0.2 |
| Melt flow index* [g/10 min] | 8.3 | 6.2 | 3.7 |
| Tensile strength** [N/mm²] | 25.6 | 29.9 | 36.5 |
| Ultimate tensile strength*** [N/mm²] | 13.2 | 14.9 | 16.4 |

*According to DIN 53,735, at 190° C. and 2.16 kg
**According to ASTM D 638
***According to ASTM D 638

EXAMPLE E 100 parts by weight of the polymer b) used in Examples A1 and A2 were reacted with 25 parts by weight of talc at 240° C. in a ZSK 40 twin-screw extruder and then worked up according to Example A, but without the addition of 1,3-bismaleimido. The average residence time was 2 minutes.

COMPARATIVE EXAMPLE E'

100 parts by weight of the polymer b) were reacted with 25 parts by weight of talc according to Example E. In addition to Example E, the reaction was carried out in the presence of 0.3 part by weight of 1,3-bismaleimidobenzene, the latter being added to polymer b) simultaneously with the talc.

EXAMPLE E1

100 parts by weight of the polymer b) (A) were reacted with 0.3 part by weight of 1,3-bismaleimidobenzene similarly to Example A2. After the end of the partial crosslinking, 25 parts by weight of talc were also added to the olefin polymer at 240° C. and mixing was carried out for 2 minutes.

The results of the tests for performance characteristics are shown in Table 4 below for Example E and E1 and Comparative Example E'.

TABLE 4

|  | Example E | Example E1 | Comparative Example E' |
|---|---|---|---|
| Parts by weight of polymer b) (A) | 100 | 100 | 100 |
| Parts by weight of talc | 25 | 25 | 25 |
| Parts by weight of 1,3-bismaleimidobenzene | — | 0.3 | 0.3 |
| Melt flow index* [g/10 min] | 15.0 | 12.1 | 14.9 |
| Tensile modulus of elasticity** [N/mm2] | 2500 | 2480 | 2450 |
| Elongation at break with joint line*** [[%] | 2 | 30 | 4 |

*According to DIN 53,735, at 230° C. and 2.16 kg
**According to DIN 53,452
***According to DIN 53,457

A comparison of Example E, Example E1 and Comparative Example E' shows that in particular the partial crosslinking without the presence of further materials (Example E1) leads to advantageous products.

We claim:

1. A partially crosslinked olefin polymer, obtained by reacting a) an ethylene polymer having a density of from 0.90 to 0.98 g/cm³ or b) a graft polymer comprising
propylene homopolymer, and
propylene copolymer, said propylene copolymer including propylene and $C_2$–$C_{10}$-alk-1-ene comonomers, said propylene homopolymer being present in said polymer b) in an amount of from 25 to 95% by weight of polymer b), said propylene copolymer being present in said polymer b) in an amount of from 5 to 75% by weight of polymer b), and each of said comonomers being present in said polymer b) in an amount of from 1 to 45% by weight of polymer b), in the absence of free radical initiators and of an inorganic filler, with from 0.001 to 5% by weight, based on the olefin polymer, of a bismaleimido compound of the formula (I)

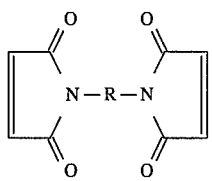

(I)

where R is $C_1$–$C_{20}$-alkyl which may be interrupted by one or more oxygen atoms, or is $C_5$–$C_7$-cycloalkyl or $C_6$–$C_{20}$-aryl, each of which in turn may be substituted by one or more $C_1$–$C_{10}$-alkyl or $C_1$–$C_6$-alkoxy or $C_1$–$C_4$-dialkylamino groups, or is a radical of the following formula (II)

(II)

where $R^1$ and $R^2$ independently of one another are each $C_1$–$C_{10}$-alkyl, $C_5$–$C_7$-cycloalkyl or $C_6$–$C_{10}$-aryl, each of which in turn may be substituted by one or more $C_1$–$C_{10}$-alkyl or $C_1$–$C_6$-alkoxy or $C_1$–$C_4$-dialkylamino groups, and Z is $C_1$–$C_{10}$-alkyl, $C_1$–$C_4$-dialkylamino, oxygen or sulfonyl.

2. A partially crosslinked olefin polymer as defined in claim 1, obtained by reacting a bismaleimido compound of the formula (I) with a polymer b) which consists of from 40 to 90% by weight of a propylene homopolymer and from 10 to 60% by weight of a propylene copolymer with from 2 to 40% by weight, based on the total polymer, of polymerized $C_2$–$C_{10}$-alk-1-enes.

3. A partially crosslinked olefin polymer as defined in claim 1, obtained by reacting a bismaleimido compound of the formula I with an ethylene polymer a) having a density of from 0.91 to 0.97 g/cm³.

4. A partially crosslinked olefin polymer as defined in claim 1, wherein the bismaleimido compound of the formula (I) is one in which R is $C_2$–$C_{10}$-alkyl which may be interrupted by one or more oxygen atoms, or is $C_5$–$C_7$-cycloalkyl or $C_6$–$C_{15}$-aryl, each of which in turn may be substituted by one or more $C_1$–$C_4$-alkyl groups, or is a radical of the formula (II) $R^1$-Z-$R^2$, where $R^1$ and $R^2$ independently of one another are each $C_1$–$C_6$-alkyl, $C_5$–$C_7$-cycloalkyl or $C_6$–$C_{10}$-aryl, and Z is oxygen or sulfonyl.

5. A partially crosslinked olefin polymer as defined in claim 1, obtained by reacting the olefin polymer a) or b) with a bismaleimido compound selected from the group consisting of 1,6-bismaleimidohexane, 1,3-bismaleimidobenzene, 1,3-bismaleimido-4-methylbenzene, 4,4'-bismaleimidodiphenylmethane, 4,4,-bismaleimido-3,5,3',5'-tetramethyldiphenylmethane and 3,3'-bismaleimidodiphenyl sulfone.

6. A film or molding of a partially crosslinked olefin polymer as claimed in claim 1.

\* \* \* \* \*

UNITED STATES PATENT AND TRADEMARK OFFICE
CERTIFICATE OF CORRECTION

PATENT NO.: 5,461,119

DATED: October 24, 1995

INVENTOR(S): MARCZINKE et al.

It is certified that error appears in the above-identified patent and that said Letters Patent is hereby corrected as shown below:

Column 10, line 11, "$C_6$-$C_{20}$-" should read -- $C_6$-$C_{15}$- --.

Signed and Sealed this

Twenty-seventh Day of February, 1996

Attest:

BRUCE LEHMAN

Attesting Officer     Commissioner of Patents and Trademarks